US008947440B2

(12) United States Patent
Choi et al.

(10) Patent No.: US 8,947,440 B2
(45) Date of Patent: Feb. 3, 2015

(54) DISPLAY DEVICE

(75) Inventors: Hee-Jin Choi, Seoul (KR); Sang-Soo Kim, Seoul (KR); Dong-Won Park, Cheonan-si (KR); Po-Yun Park, Asan-si (KR); Bong-Hyun You, Yongin-si (KR); Dong-Gyun Ra, Asan-si (KR)

(73) Assignee: Samsung Display Co., Ltd., Yongin (KR)

( * ) Notice: Subject to any disclaimer, the term of this patent is extended or adjusted under 35 U.S.C. 154(b) by 1019 days.

(21) Appl. No.: 12/489,981

(22) Filed: Jun. 23, 2009

(65) Prior Publication Data

US 2010/0007650 A1 Jan. 14, 2010

(30) Foreign Application Priority Data

Jul. 14, 2008 (KR) ........................ 10-2008-0068239

(51) Int. Cl.
*G06T 13/00* (2011.01)
*G09G 3/20* (2006.01)

(52) U.S. Cl.
CPC ............ *G09G 3/20* (2013.01); *G09G 2320/106* (2013.01); *G09G 2340/0435* (2013.01)
USPC ............................ 345/473; 345/213; 382/300

(58) Field of Classification Search
USPC ........................... 345/473, 213; 382/300, 197
See application file for complete search history.

(56) References Cited

U.S. PATENT DOCUMENTS 8,059,713 B2 * 11/2011 Kazui et al. .............. 375/240.03
2007/0065139 A1 * 3/2007 Ishii .............................. 396/311
2007/0140351 A1 * 6/2007 Ho ........................... 375/240.24
2007/0236603 A1 * 10/2007 Itoh et al. ....................... 348/441
2007/0258588 A1 * 11/2007 Ogata ........................... 380/201
2008/0074350 A1 3/2008 Beon et al.
2008/0191983 A1 * 8/2008 Chang et al. .................... 345/87
2008/0238847 A1 * 10/2008 Aiba et al. ....................... 345/87
2008/0291326 A1 * 11/2008 Shishido et al. .............. 348/555
2009/0009455 A1 * 1/2009 Kimura ........................... 345/89

FOREIGN PATENT DOCUMENTS

JP 2004317928 11/2004
JP 2005241787 9/2005
KR 1020070048847 5/2007
KR 10-0806858 2/2008

* cited by examiner

*Primary Examiner* — Maurice L McDowell, Jr.
*Assistant Examiner* — Kyle Zhai
(74) *Attorney, Agent, or Firm* — H.C. Park & Associates, PLC

(57) ABSTRACT

A display device includes an image signal processing unit to output a high-speed image signal with the aid of an image interpolation unit outputting a low-speed image signal. The display device includes an image signal processing unit to receive a primitive image signal having a first frequency and to output a 4× image signal having a second frequency. The second frequency is four times the first frequency. The display device includes a display panel displaying an image corresponding to the 4× image signal. The primitive image signal includes an (n−1)-th frame (where n is a natural number) and an n-th frame. The image signal processing unit includes a first image interpolation unit and second image interpolation unit, which receive the (n−1)-th frame and the n-th frame and output a 2× image signal including at least one interpolated frame.

19 Claims, 9 Drawing Sheets

<RGB_org (freq = 60Hz>

<RGB_mtp (freq = 240Hz>

DISPLAY DEVICE

CROSS REFERENCE TO RELATED APPLICATION

This application claims priority from and the benefit of Korean Patent Application No. 10-2008-0068239, filed on Jul. 14, 2008, which is incorporated herein by reference for all purposes as if fully set forth herein.

BACKGROUND OF THE INVENTION

1. Field of the Invention

The present invention relates to a display device, and more particularly, a display device which includes an image signal processing unit capable of outputting a high-speed image signal with the aid of an image interpolation unit outputting a low-speed image signal.

2. Discussion of the Background

Recently, techniques have been developed for improving the display quality of a display device by inserting interpolated frames among original frames. The interpolated frames are obtained by compensating for the motion of an object. In these techniques, if image information regarding 60 original frames is given, for example, image information regarding sixty interpolated frames may be additionally provided, thereby providing an image having a total of 120 frames.

In order to realize the above-mentioned interpolation techniques, display devices may include an image interpolation module which outputs an image signal including a number of interpolated frames.

The greater the number of interpolated frames inserted among original frames, the higher the device's display quality. In order to insert many interpolated frames among original frames, an image interpolation module capable of outputting a high-speed image signal may be required. However, it may be costly and time-consuming to develop an image interpolation module capable of outputting a high-speed image signal.

SUMMARY OF THE INVENTION

The present invention provides a display device which includes an image signal processing unit capable of outputting a high-speed image signal with the aid of an image interpolation unit outputting a low-speed image signal.

Additional features of the invention will be set forth in the description which follows, and in part will be apparent from the description, or may be learned by practice of the invention.

The present invention discloses a display device including an image signal processing unit receiving a primitive image signal having a first frequency and outputting a 4× image signal having a second frequency, the second frequency being four times that of the first frequency. The display device also includes a display panel to display an image corresponding to the 4× image signal, wherein the primitive image signal includes an (n−1)-th frame (where n is a natural number) and an n-th frame. The image signal processing unit includes first image interpolation unit and second image interpolation unit, where each of the first image interpolation unit and the second image interpolation unit receives the (n−1)-th frame and the n-th frame, and outputs a 2× image signal including at least one interpolated frame.

The present invention also discloses a display device including an image signal processing unit to receive a primitive image signal having a first frequency and output a p× image signal (where p is a natural number) having a second frequency, the second frequency being p times that of the first frequency. The display device also includes a display panel to display an image corresponding to the p× image signal, wherein the image signal processing unit includes at least two image interpolation units, and each image interpolation unit receives the primitive image signal and outputs a q× image signal (where q is a natural number smaller than the natural number p) having a third frequency, the third frequency being between the first frequency and the second frequency.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

Figure 1:
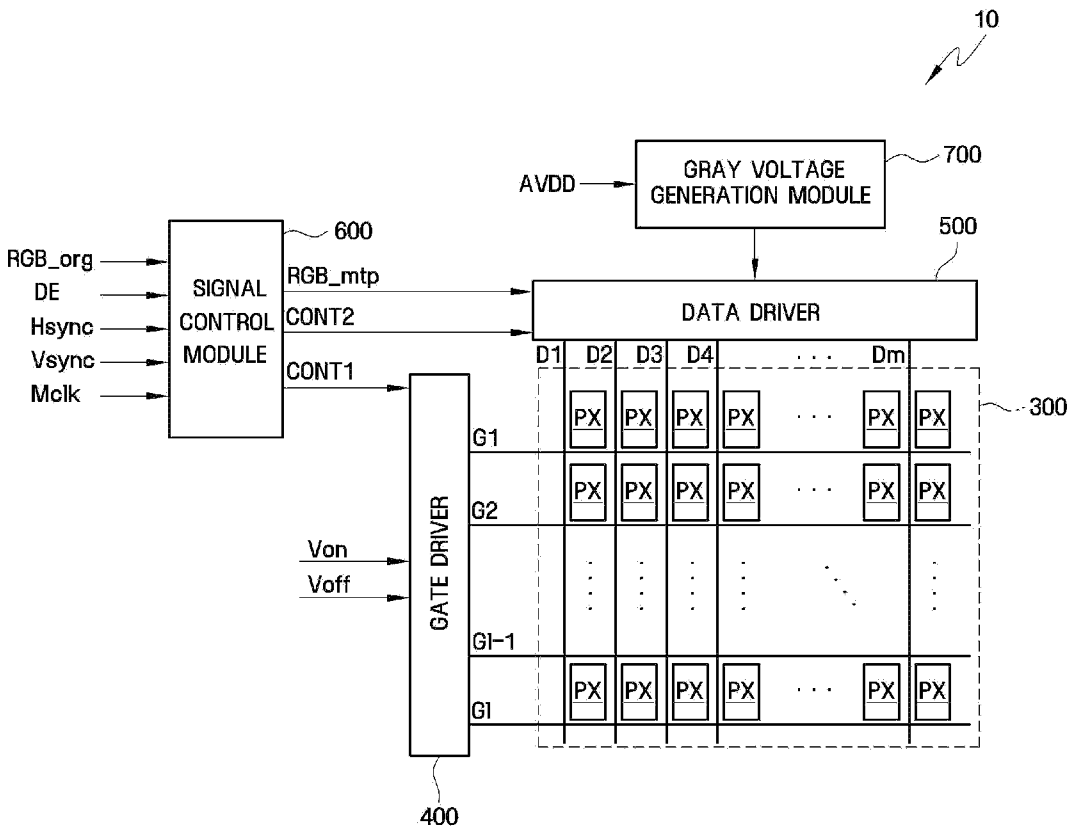
FIG. 1 shows a block diagram of a display device according to an exemplary embodiment of the present invention.

The present invention is described more fully hereinafter with reference to the accompanying drawings, in which exemplary embodiments of the invention are shown. The invention may, however, be embodied in many different forms and should not be construed as being limited to the embodiments set forth herein. Rather, these embodiments are provided so that this disclosure is thorough, and will fully convey the concept of the invention to those skilled in the art. In the drawings, the size and relative sizes of layers and regions may be exaggerated for clarity. Like reference numerals in the drawings denote like elements.

It will be understood that when an element is referred to as being "on" or "connected to" another element, it can be directly on or directly connected to the other element, or intervening elements may be present. In contrast, when an element is referred to as being "directly on" or "directly connected" to another element, there are no intervening elements present.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present invention.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

A display device according to an exemplary embodiment of the present invention will hereinafter be described in detail with reference to FIG. 1, FIG. 2, FIG. 3, FIG. 4*a*, FIG. 4*b*, FIG. 5, FIG. 6*a*, FIG. 6*b*, FIG. 7, FIG. 8, and FIG. 9.

Figure 2:
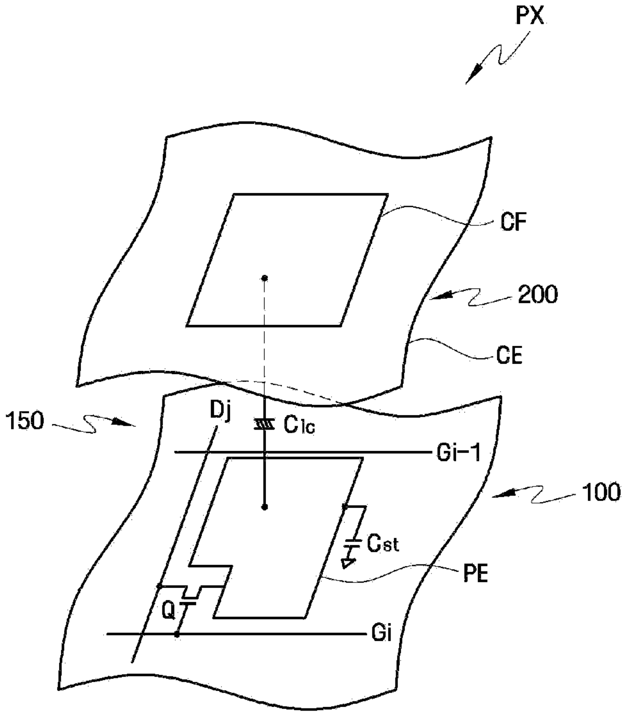
FIG. 2 shows an equivalent circuit diagram of a pixel of a display panel shown in FIG. 1.

FIG. 1 shows a block diagram of a display device 10 according to an exemplary embodiment of the present invention, and FIG. 2 shows an equivalent circuit diagram of a pixel PX of a display panel 300 shown in FIG. 1.

Referring to FIG. 1, the LCD 10 includes a display panel 300, a signal control module 600, a gate driver 400, a data driver 500, and a gray voltage generation module 700.

The display panel 300 includes a plurality of gate lines G1 through G1, a plurality of data lines D1 through Dm, and a plurality of pixels Px. The gate lines G1 through G1 extend in a first direction in parallel with one another, and the data lines D1 through Dm extend in a second direction in parallel with one another. The pixels Px are disposed at the interconnections between the gate lines G1 through G1 and the data lines D1 through Dm. A gate signal may be applied to each of the gate lines G1 through G1 by the gate driver 400, and an image data voltage may be applied to each of the data lines D1 through Dm by the data driver 500. Each of the pixels Px displays an image in response to the image data voltage.

The signal control module 600 may output a 4× image signal RGB_mtp to the data driver 500. The data driver 500 may output an image data voltage corresponding to the 4× image signal RGB_mtp. Each of the pixels Px displays an image in response to a corresponding image data voltage, and may thus be able to display an image corresponding to the 4× image signal RGB_mtp.

The display panel 300 may include a plurality of display blocks DB, where each display block includes a number of pixels Px arranged in a matrix, which will be described later in further detail.

Referring to FIG. 2, a pixel Px, which is connected to an i-th gate line Gi (1≤i≤1) and a j-th data line Dj (1≤j≤m), includes a switching element Q, which is connected to the i-th gate line Gi and the j-th data line Dj, and a liquid crystal capacitor $C_{lc}$ and a storage capacitor $C_{st}$, which are both connected to the switching element Q. The liquid crystal capacitor $C_{lc}$ includes a pixel electrode PE, which is formed on the first display panel 100, a common electrode CE, which is formed on the second display panel 200, and liquid crystal molecules 150, which are interposed between the first display panel 100 and the second display panel 200. A color filter CF may be arranged corresponding to the pixel electrode PE. In an exemplary embodiment, the common electrode CE may be formed on the first substrate.

Referring to FIG. 1, the signal control module 600 receives a primitive image signal RGB_org and a plurality of external control signals DE, Hsync, Vsync and Mclk for controlling the display of the primitive image signal RGB_org, and may output the 4× image signal RGB_mtp, a gate control signal CONT1 and a data control signal CONT2. The primitive image signal RGB_org has a first frequency, and the 4× image signal RGB_mtp has a second frequency, which is four times that of the first frequency. For example, the primitive image signal RGB_org may have a frequency of 60 Hz, and the 4× image signal RGB_mtp may have a frequency of 240 Hz.

More specifically, the signal control module 600 may receive the primitive image signal RGB_org, and may output the 4× image signal RGB_mtp. In addition, the signal control module 600 may receive the external control signals Vsync, Hsync, Mclk and DE from an external source, and may generate the gate control signal CONT1 and the data control signal CONT2. The external control signals Vsync, Hsync, Mclk and DE include a vertical synchronization signal Vsync, a horizontal synchronization signal Hsync, a main clock signal Mclk, and a data enable signal DE. The gate control signal CONT1 is a signal for controlling the operation of the gate driver 400, and the data control signal CONT2 is a signal for controlling the operation of the data driver 500. The signal control module 600 will be described below in further detail with reference to FIG. 3.

The gate driver 400 is provided with the gate control signal CONT1 by the signal control module 600, and applies a gate signal to the gate lines G1 through G1. The gate signal may include the combination of a gate-on voltage Von and a gate-off voltage Voff, which are provided by a gate-on/off voltage generation module (not shown).

The data driver 500 is provided with the data control signal CONT2 by the signal control module 600, and applies an image data voltage corresponding to the 4× image signal RGB_mtp to the data lines D1 through Dm. The image data voltage corresponding to the 4× image signal RGB_mtp may be provided by the gray voltage generation module 700.

The gray voltage generation module 700 may generate image data voltages using various methods. For example, the gray voltage generation module 700 may generate an image data voltage by dividing a driving voltage AVDD according to the grayscale level of the 4× image signal RGB_mtp, and may provide the generated image data voltage. The gray voltage generation module 700 may include a plurality of resistors which are connected in series between a ground and a node, to which the driving voltage AVDD is applied, and may thus generate a plurality of gray voltages by dividing the driving voltage AVDD. In an exemplary embodiment, the gray voltage generation module 700 may provide the data driver 500 with a gray reference voltage, and the data driver 500 may generate the image data voltage by dividing the gray reference voltage according to the gray scaled level of the 4× image signal RGB_mtp.

Figure 3:
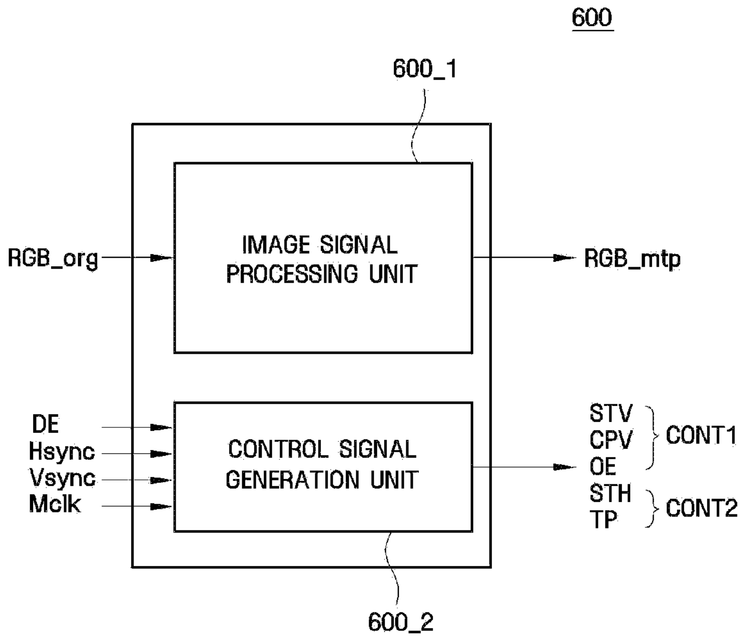
FIG. 3 shows a block diagram of a signal control module shown in FIG. 1.
Figure 4A:
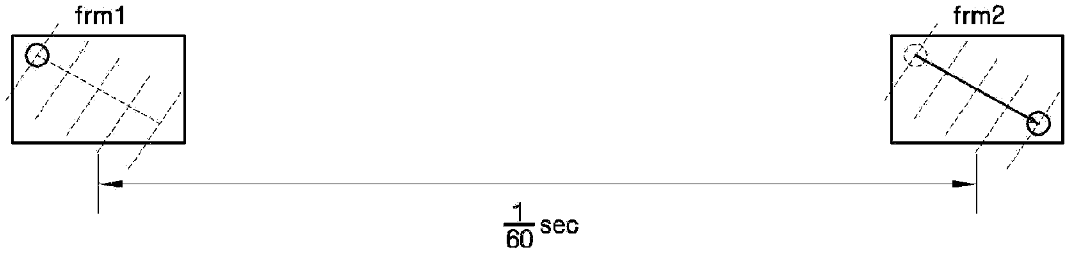
FIG. 4*a* shows a diagram of a plurality of frames included in a primitive image signal of FIG. 3.
Figure 4B:
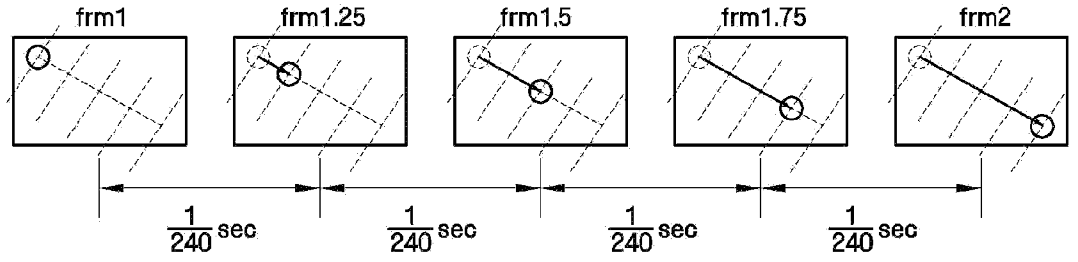
FIG. 4*b* shows a diagram of a plurality of frames included in a 4× image signal of FIG. 3.

FIG. 3 shows a block diagram of the signal control module 600, FIG. 4*a* shows a diagram of a plurality of frames including the primitive image signal RGB_org, and FIG. 4*b* shows a diagram of a plurality of frames including the 4× image signal RGB_mtp.

Referring to FIG. 3, the signal control module 600 may include an image signal processing unit 600_1 and a control signal generation unit 600_2.

In order to improve the display quality of the display device 10, the image signal processing unit 600_1 may insert a number of interpolated frames among original frames, and may output the results of the insertion. The image signal processing unit 600_1 may receive the primitive image signal RGB_org and may output the 4× image signal RGB_mtp. The primitive image signal RGB_org has the first frequency, and the 4× image signal RGB_mtp has the second frequency, which is four times that of the first frequency.

The primitive image signal RGB_org and the 4× image signal RGB_mtp will hereinafter be described in further detail with reference to FIG. 4*a* and FIG. 4*b*. Referring to FIG. 4*a* and FIG. 4*b*, the primitive image signal RGB_org may have a frequency of 60 Hz, and the 4× image signal RGB_mtp may have a frequency of 240 Hz.

Referring to FIG. 4*a*, the primitive image signal RGB_org is included in (n−1)-th frame frm1 and the n-th frame frm2, which are sequentially output at an interval of 1/60 sec.

Referring to FIG. 4*b*, the 4× image signal RGB_mtp is included in the (n−1)-th frame frm1, the n-th frame frm2, and three interpolated frames, i.e., a ¼ interpolated frame frm1.25, a ½ interpolated frame frm1.5 and a ¾ interpolated frame frm1.75. The ½ interpolated frame is inserted between the (n−1)-th frame frm1 and the n-th frame frm2, the ¼ interpolated frame is inserted between the (n−1)-th frame frm1 and the ½ interpolated frame frm1.5, and the ¾ interpolated frame frm1.75 is inserted between the ½ interpolated frame frm1.5 and the n-th frame frm2. In short, the ¼ interpolated frame frm1.25, the ½ interpolated frame frm1.5 and the ¾ interpolated frame frm1.75 are all inserted between the (n−1)-th frame frm1 and the n-th frame frm2 of the primitive image signal RGB_org. Thus, it is possible to improve the display quality of the display device 10.

The structure and the operation of the image signal processing unit 600_1 will be described later in further detail with reference to FIG. 5.

Referring to FIG. 3, the control signal generation unit 600_2 may receive the external control signals DE, Hsync, Vsync, and Mclk and may generate the data control signal CONT2 and the gate control signal CONT1. The gate control signal CONT1 is a signal for controlling the operation of the gate driver 400. The gate control signal CONT1 may include a vertical initiation signal STV for initiating the operation of the gate driver 400, a gate clock signal CPV for determining when to output the gate-on voltage Von, and an output enable signal OE for determining the pulse width of the gate-on voltage Von. The data control signal CONT2 may include a horizontal initiation signal STH for initiating the operation of the data driver 500 and an output instruction signal TP for providing instructions to output an image data voltage.

Figure 5:
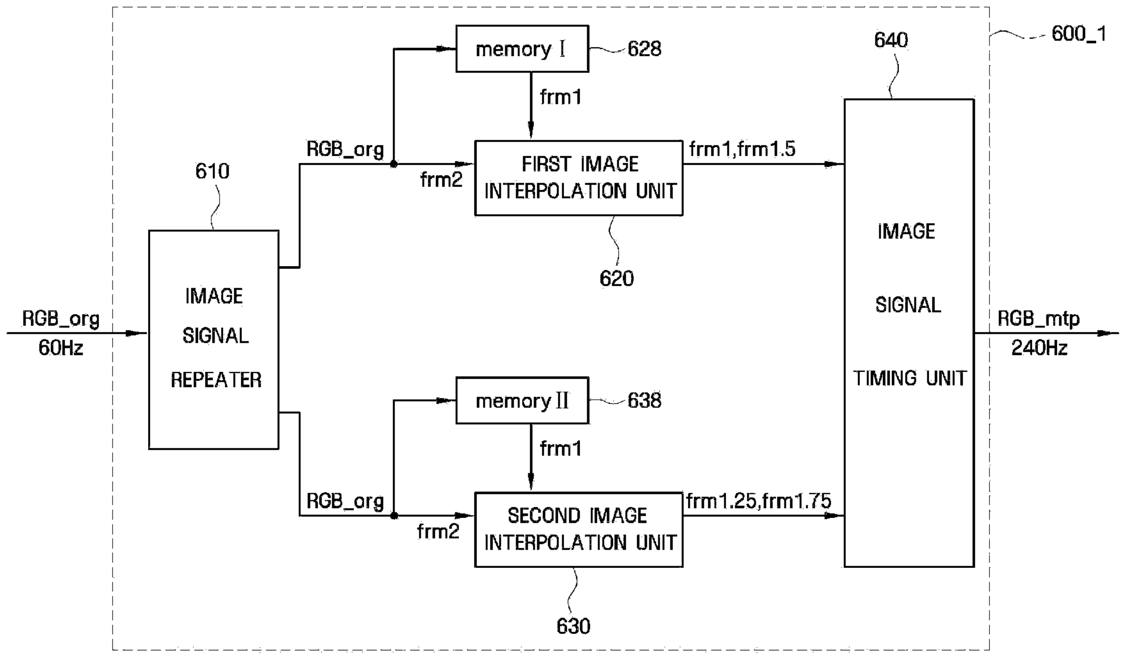
FIG. 5 shows a block diagram of an image signal processing unit shown in FIG. 3.

FIG. 5 shows a block diagram of the image signal processing unit 600_1 shown in FIG. 3. Referring to FIG. 5, the image signal processing unit 600_1 includes a first image interpolation unit 620, a second image interpolation unit 630, a first memory 628, a second memory 638, an image signal repeater 610 and an image signal timing unit 640.

The image signal repeater 610 receives the primitive image signal RGB_org, and transmits the primitive image signal RGB_org to the first image interpolation unit 620 and the second image interpolation unit 630.

The (n−1)-th frame frm1 of the primitive image signal RGB_org may be stored in the first memory 628 and the second memory 638.

The first image interpolation unit 620 and the second image interpolation unit 630 may receive the primitive image signal RGB_org, and may output a 2× image signal including at least one interpolated frame.

More specifically, the first image interpolation unit 620 may acquire the primitive image signal RGB_org by receiving the n-th frame frm2 of the primitive image signal RGB_org from the image signal repeater 610 and reading the (n−1)-th frame frm1 of the primitive image signal RGB_org from the first memory 628.

Likewise, the second image interpolation unit 630 may acquire the primitive image signal RGB_org by receiving the n-th frame frm2 of the primitive image signal RGB_org from the image signal repeater 610 and reading the (n−1)-th frame frm1 of the primitive image signal RGB_org from the second memory 638.

Each of the first image interpolation unit 620 and the second image interpolation units 630 may be provided with the primitive image signal RGB_org, e.g., image data including 60 frames, may generate image data corresponding to a number of interpolated frames, and may thus provide a 2× image signal, i.e., image data having 120 frames.

More specifically, each of the first image interpolation unit 620 and the second image interpolation unit 630 may output a 2× image signal by outputting two of the (n−1)-th frame frm1, the ½ interpolated frame frm1.5, the ¼ interpolated frame frm1.25, and the ¾ interpolated frame frm1.75. For example, referring to FIG. 5, the first image interpolation unit 620 may output a 2× image signal having one interpolated frame by outputting the (n−1)-th frame frm1 and the ½ interpolated frame frm1.5. The second image interpolation unit 630 may output a 2× image signal having two interpolated frames by outputting the ¼ interpolated frame frm1.25 and the ¾ interpolated frame frm1.75.

The image signal timing unit 640 may be provided with four frames, i.e., the (n−1)-th frame frm1, the ¼ interpolated frame frm1.25, the ½ interpolated frame frm1.5 and the ¾ interpolated frame frm1.75, by the first image interpolation unit 620 and the second image interpolation unit 630, and may thus provide the 4× image signal RGB_mtp to the data driver 500 shown in FIG. 1. Then, the data driver 500 may transmit an image data voltage corresponding to the 4× image signal RGB_mtp to the display panel 300 shown in FIG. 1. The image signal timing unit 640 will be described in further detail below with reference to FIG. 9.

Figure 6A:
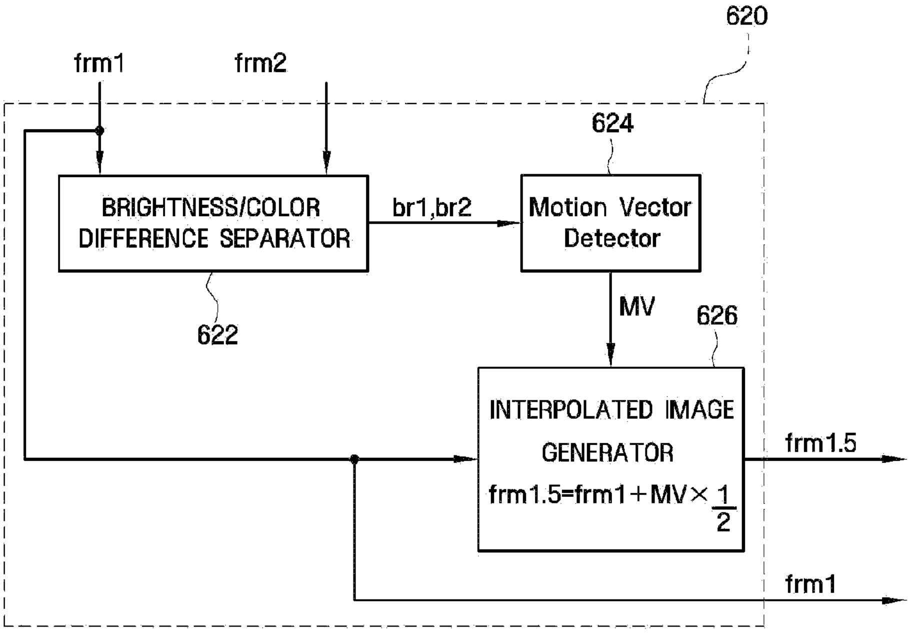
FIG. 6*a* shows a block diagram of a first image interpolation unit shown in FIG. 5.
Figure 6B:
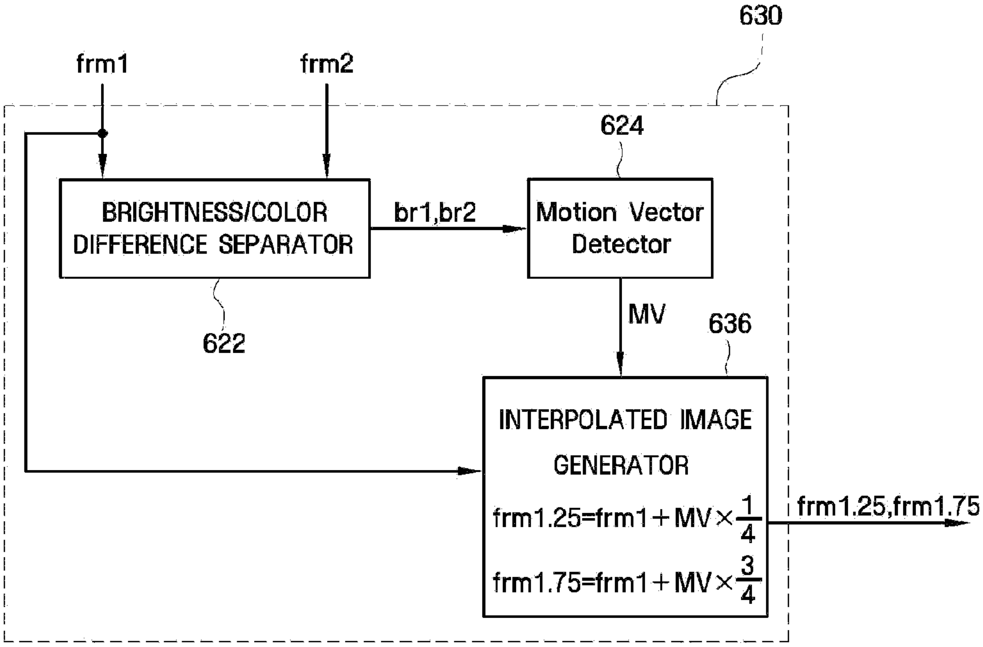
FIG. 6*b* shows a block diagram of a second image interpolation unit shown in FIG. 5.

FIG. 6*a* shows a block diagram of the first image interpolation unit 620 shown in FIG. 5, and FIG. 6*b* shows a block diagram of the second image interpolation unit 630 shown in FIG. 5.

Referring to FIG. 6*a* and FIG. 6*b*, the first image interpolation unit 620 and the second image interpolation unit 630 may calculate a motion vector MV of a predetermined object by comparing the (n−1)-th frm1 and n-th frame frm2. Thereafter, the first image interpolation unit 620 and second image interpolation unit 630 may generate the ¼ interpolated frame frm1.25, the ½ interpolated frame frm1.5 and the ¾ interpolated frame frm1.75 based on the motion vector MV.

The first image interpolation unit 620 may include a brightness/color difference separator 622, a motion vector detector 624, and an interpolated image generator 626. The second image interpolation unit 630 may include a brightness/color difference separator 632, a motion vector detector 634, and an interpolated image generator 636.

The brightness/color difference separators 622 and 632 separate a brightness component br1 and a color difference component (not shown) from the (n−1)-th frame frm1 and separate a brightness component br2 and a color difference component (not shown) from the n-th frame frm2. A brightness component of an image signal has information regarding the brightness of the image signal. A color-difference component of an image signal has information regarding the color(s) of the image signal.

The motion vector detectors 624 and 634 calculate the motion vector MV by comparing the (n−1)-th frame frm1 and the n-th frame frm2. For example, the motion vector detectors 624 and 634 may calculate the motion vector MV by comparing the brightness components br1 and br2.

The motion vector is a physical quantity indicating the motion of an object in an image. The motion vector detectors 624 and 634 may analyze the brightness components br1 and br2 of the (n−1)-th frame frm1 and the n-th frame frm2, and may determine that a predetermined object is located in portions of the (n−1)-th frame frm1 and the n-th frame frm2 having almost the same brightness distribution. Then, the motion vector detectors 624 and 634 may extract the motion vector MV based on the motion of the predetermined object between the (n−1)-th frame frm1 and the n-th frame frm2. The extraction of the motion vector MV will be described in further detail below with reference to FIG. 7.

The interpolated image generator 626 may calculate a position of the predetermined object in the ½ interpolated frame frm1.5 based on the motion vector MV provided by the motion vector detector 624, and may output ½ interpolated frame frm1.5. The interpolated image generator 636 may calculate a position of the predetermined object in the ¼ interpolated frame frm1.25 and the ¾ interpolated frame frm1.75, respectively, based on the motion vector MV provided by the motion vector detector 634, and may output the ¼ interpolated frame frm1.25 and the ¾ interpolated frame frm1.75.

The interpolated image generators 626 and 636 may generate different interpolated images by applying different weights to the motion vector MV. More specifically, the interpolated image generator 626 may generate the ½ interpolated frame frm1.5 by applying a weight of ½ to the motion vector MV. The interpolated image generator 636 may generate the ¼ interpolated frame frm1.25 and the ¾ interpolated frame frm1.75 by applying weights of ¼ and ¾, respectively, to the motion vector MV.

The calculation of the motion vector MV by the first image interpolation unit 620 and second image interpolation unit 630 and the generation of the ¼ interpolated frame frm1.25, the ½ interpolated frame frm1.5 and the ¾ interpolated frame frm1.75 based on the motion vector MV by the first image interpolation unit 620 and second image interpolation unit 630 will be described in further detail below with reference to FIG. 7 and FIG. 8.

Figure 7:
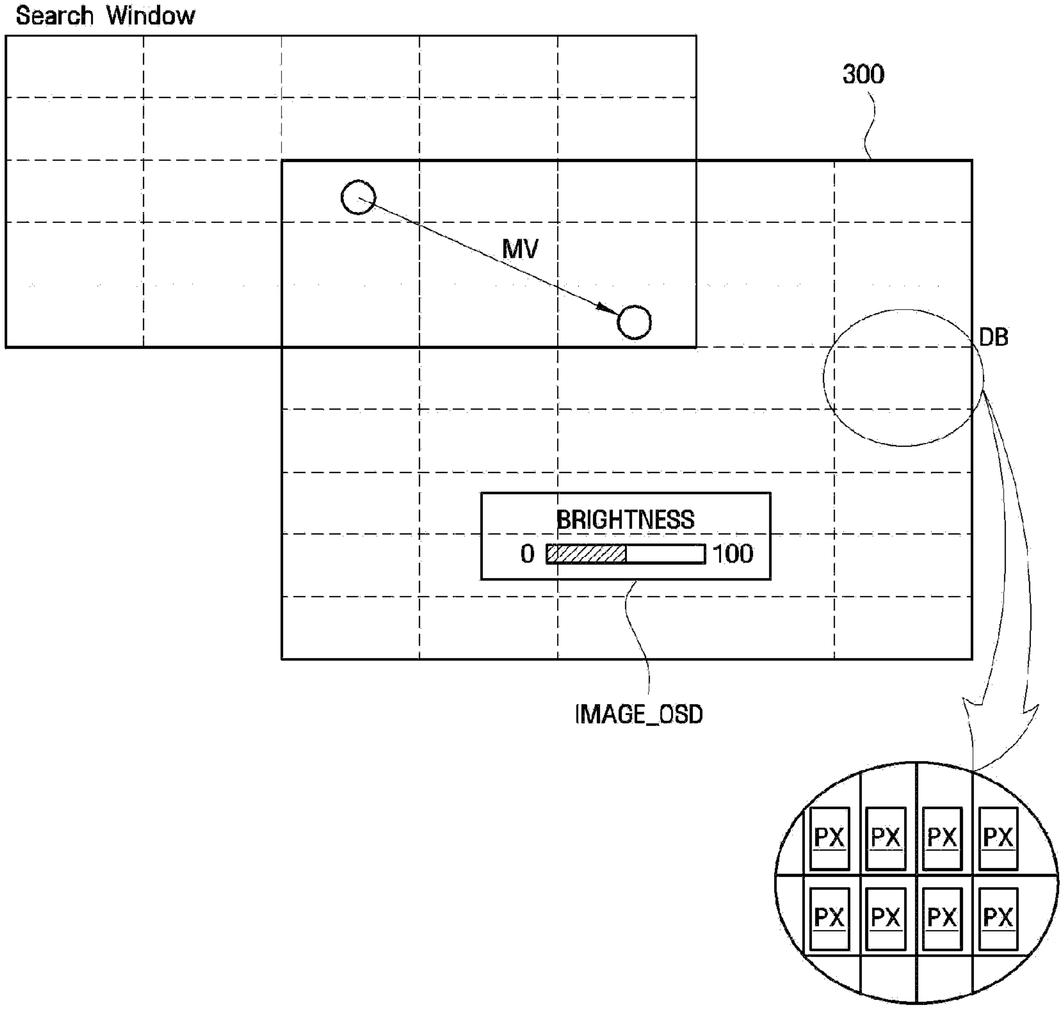
FIG. 7 shows a diagram for explaining the calculation of a motion vector by each of the first and second image interpolation units shown in FIG. 5.
Figure 8:
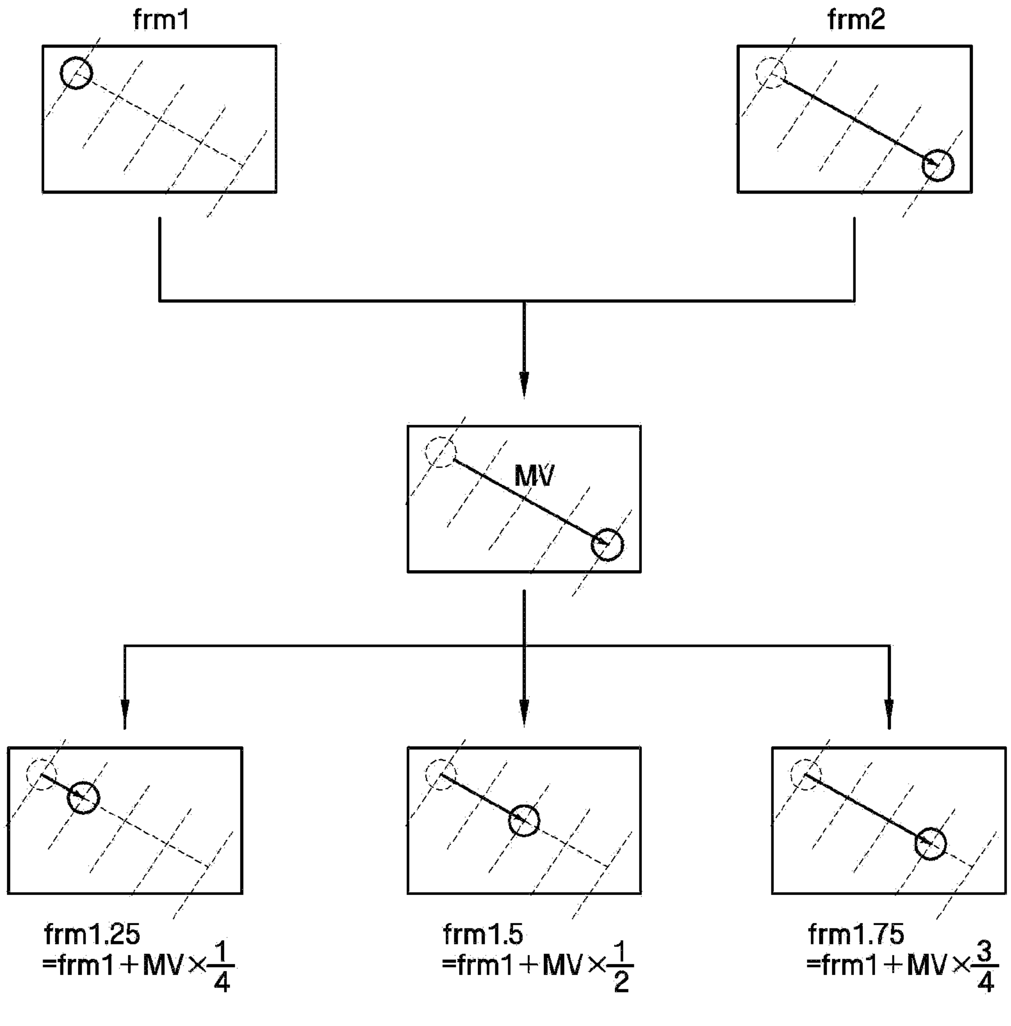
FIG. 8 shows a diagram for explaining the generation of an interpolated frame using a motion vector.

FIG. 7 shows a diagram for explaining the calculation of the motion vector MV by the first image interpolation unit 620 and the second image interpolation unit 630, and FIG. 8 shows a diagram for explaining the generation of the ¼ interpolated frame frm1.25, the ½ interpolated frame frm1.5 and the ¾ interpolated frame frm1.75 based on the motion vector MV by the first image interpolation unit 620 and the second image interpolation unit 630.

Referring to FIG. 7, the display panel 300 may include a plurality of display blocks DB, and each display block DB may include a plurality of pixels Px arranged in a matrix. That is, the display panel 300 is divided into the display blocks DB, each display block DB including a plurality of pixels Px, as indicated by dotted lines.

Each of the first image interpolation unit 620 and the second image interpolation unit 630 may detect the same object from the (n−1)-th frame frm1 and the n-th frame frm2 by comparing a primitive image signal RGB_org corresponding to the (n−1)-th frame frm1 and a primitive image signal RGB_org corresponding to the n-th frame frm2. More specifically, each of the first image interpolation unit 620 and the second image interpolation unit 630 may detect the same object from the (n−1)-th frame frm1 and the n-th frame frm2 by using a sum-of-absolute differences (SAD) method. In the SAD method, a display block DB of a previous frame producing a smallest sum of absolute luminance differences with each display block DB of a current frame is determined to be the best matching block for a corresponding display block DB of the current frame. The SAD method is well-known to one of ordinary skill in the art, to which the present invention pertains, and thus, a detailed description of the SAD method will be omitted.

Each of the first image interpolation unit 620 and second image interpolation unit 630 may detect the same object from the (n−1)-th frame frm1 and the n-th frame frm2 using a search window. That is, each of the first image interpolation unit 620 and the second image interpolation unit 630 may detect the same object from the (n−1)-th frame frm1 and the n-th frame frm2 by searching through only a number of display blocks DB within the search window.

Referring to FIG. 7, a circular object and an on-screen display (OSD) image IMAGE_OSD are detected from both the (n−1)-th frame frm1 and the n-th frame frm2. The motion vector MV is the motion vector of the circular object and is indicated by an arrow. The OSD image IMAGE_OSD may be an example of a still object or still text. A still object or still text has a motion vector of 0. The OSD image IMAGE_OSD is well-known to one of ordinary skill in the art, to which the present invention pertains, and thus, a detailed description of the OSD image IMAGE_OSD will be omitted.

Referring to FIG. 8, the ¼ interpolated frame frm1.25, the ½ interpolated frame frm1.5 and the ¾ interpolated frame frm1.75 may be obtained by applying different weights to the motion vector MV. More specifically, the ¼ interpolated frame frm1.25, the ½ interpolated frame frm1.5, and the ¾ interpolated frame frm1.75 may be obtained by applying weights of ¼, ½ and ¾, respectively, to the motion vector MV.

Figure 9:
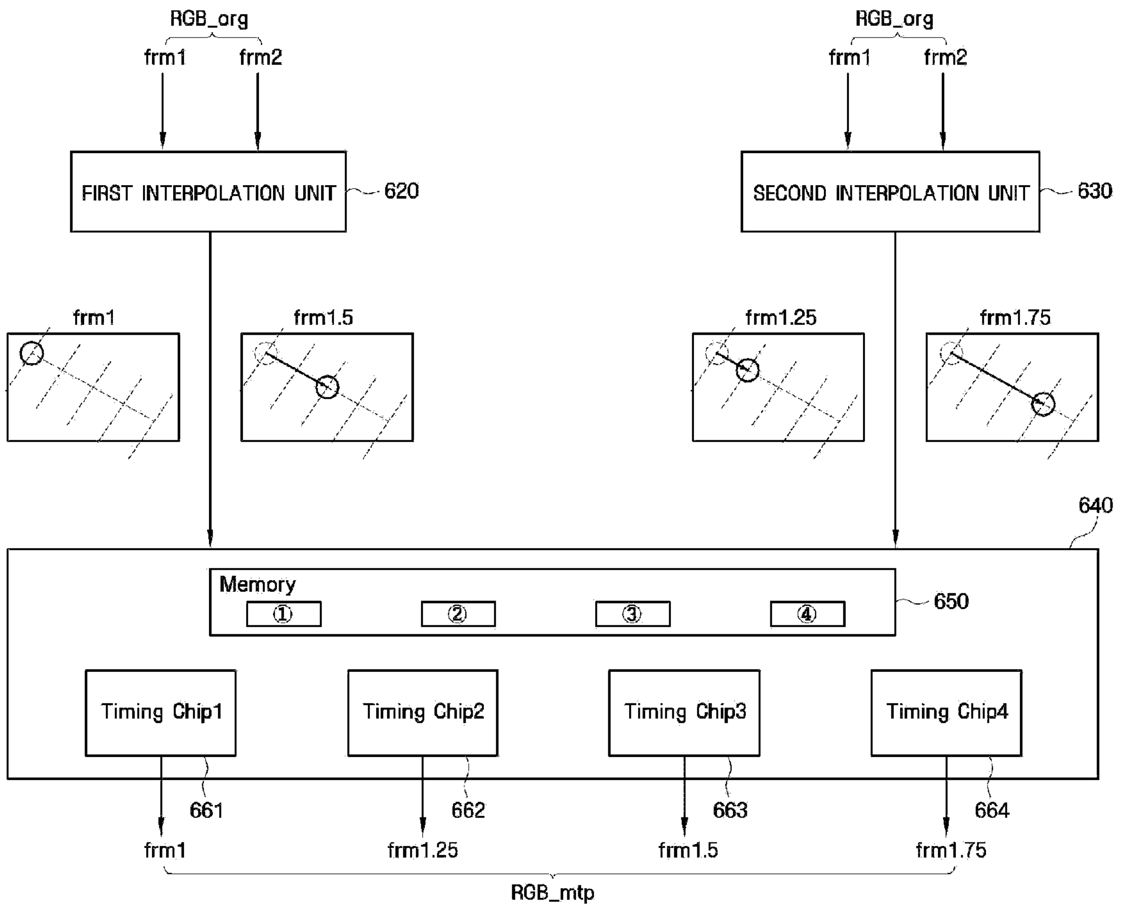
FIG. 9 shows a block diagram of an image signal timing unit shown in FIG. 5.

FIG. 9 shows a block diagram of the image signal timing unit 640. Referring to FIG. 9, the image signal timing unit 640 includes four timing chips 661, 662, 663, and 664 and a memory 650.

Each timing chip 661, 662, 663, and 664 may transmit an image signal having the same frequency as that of the primitive image signal RGB_org. Each of the first image interpolation unit 620 and the second image interpolation unit 630 may output two frames at the same time. More specifically, the first image interpolation unit 620 may output the (n−1)-th frame frm1 and the ½ interpolated frame frm1.5 at the same time, and the second image interpolation unit 640 may output ¼ interpolated frame frm1.25 and the ¾ interpolated frame frm1.75 at the same time.

Therefore, the memory 650 of the image signal timing unit 640 should be able to store four frames therein.

The timing chips 661, 662, 663, and 664 may read four frames present in the memory 650, and may thus sequentially provide the (n−1)-th frame frm1, the ¼ interpolated frame frm1.25, the ½ interpolated frame frm1.5, and the ¾ interpolated frame frm1.75 to the data driver 500 shown in FIG. 1.

Figure 10:
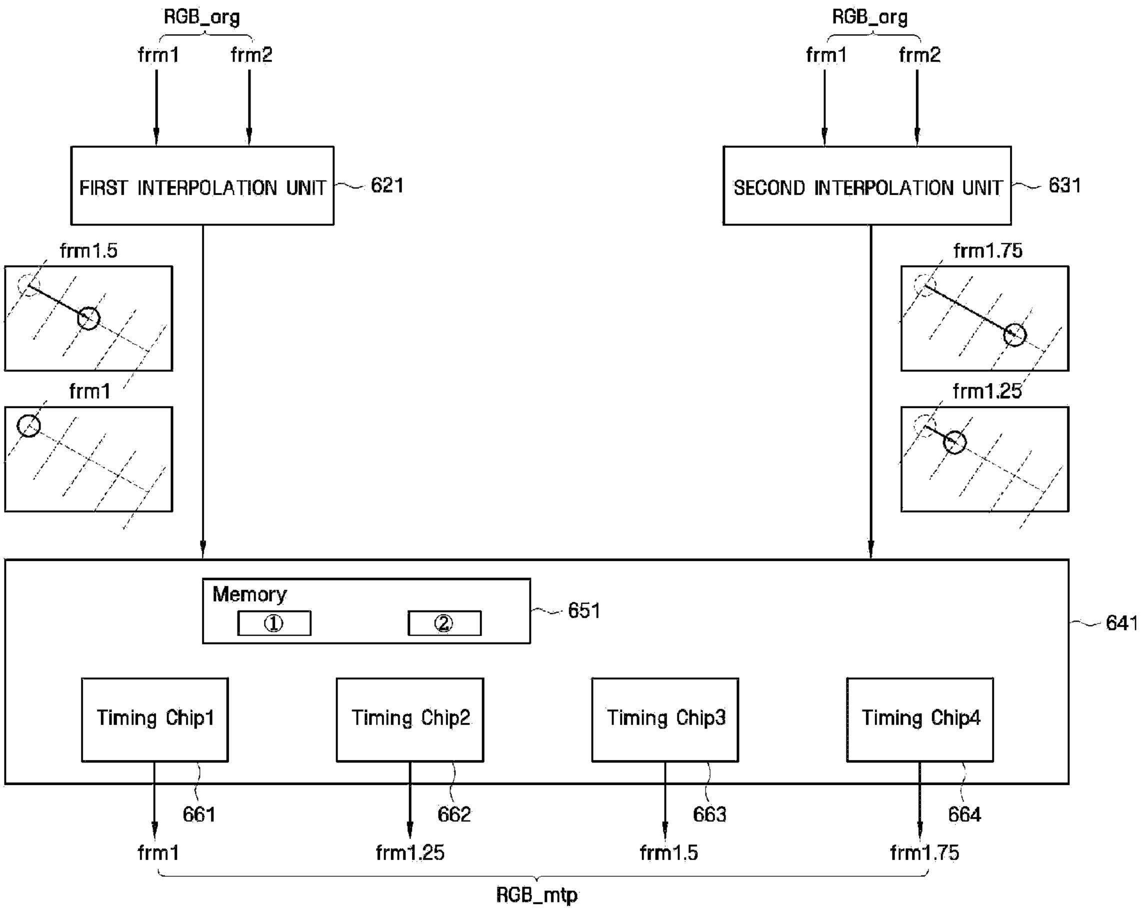
FIG. 10 shows a block diagram of an image signal timing unit of a display device according to another exemplary embodiment of the present invention.

FIG. 10 shows a block diagram of an image signal timing unit 641 of a display device according to another exemplary embodiment of the present invention. Referring to FIG. 10, the image signal timing unit 641 includes four timing chips 661, 662, 663, and 664 and a memory 651.

The timing chips 661, 662, 663, and 664 may transmit an image signal having the same frequency as that of a primitive image signal RGB_org. Each of first image interpolation unit 621 and second image interpolation unit 631 may output two frames, but not at the same time, whereas each of the first image interpolation unit 620 and second image interpolation unit 630 outputs two frames at the same time. More specifically, the first image interpolation unit 621 outputs an (n−1)-th frame frm1 and then a ¼ interpolated frame frm1.25. The second image interpolation unit 631 outputs a ½ interpolated frame frm1.5 and then a ¾ interpolated frame frm1.75.

Therefore, the memory 651 of the image signal timing unit 640 should be able to store two frames therein.

The timing chips 661, 662, 663, and 664 may read the (n−1)-th frame frm1 and the ¼ interpolated frame frm1.25 from the memory 651 and may sequentially provide the (n−1)-th frame frm1 and the ¼ interpolated frame frm1.25 from the memory 651 to the data driver 500 shown in FIG. 1. Thereafter, the timing chips 661, 662, 663, and 664 may read the ½ and ¾ interpolated frames frm1.5 and frm1.75 from the memory 651 and may sequentially provide the ½ interpolated frame frm1.5 and the ¾ interpolated frame frm1.75 from the memory 651 to the data driver 500.

In this manner, the image signal timing unit 640 may be able to sequentially provide the (n−1)-th frame frm1, the ¼ interpolated frame frm1.25, the ½ interpolated frame frm1.5, and the ¾ interpolated frame frm1.75 to the data driver 500, even if the memory 651 is capable of storing only a maximum of two frames.

As described above, the display device according to the present invention may include an image signal processing unit, which receives a primitive image signal having a first image frequency and can output a 4× image signal having a second image frequency that is four times that of the first frequency, and a display panel, which can display an image corresponding to the 4× image signal.

The present invention can also be applied to a display device including an image signal processing unit capable of outputting a p× image signal (where p is a natural number) having the second frequency based on a primitive image signal having the first frequency and a display panel capable of displaying an image corresponding to the p× image signal. More specifically, the image signal processing unit may include at least two image interpolation units, an image signal repeater and an image signal timing unit.

Each of the image interpolation units is provided with the primitive image signal, and may output a q× image signal (where q is a natural number smaller than the natural number p) having a third frequency, which is between the first and second frequencies. Each of the image interpolation units may calculate a motion vector of an object by comparing an (n−1)-th frame and an n-th frame, and may generate at least one interpolated frame by applying different weights to the motion vector.

The image signal repeater receives the primitive image signal and transmits the primitive image signal to the image interpolation units.

The image signal timing unit may be provided with a q× image signal by each of the image interpolation units and may output a p× image signal.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A display device, comprising:

an image signal processing unit configured to receive a primitive image signal having a first frequency and outputting a 4× image signal having a second frequency, the second frequency being four times that of the first frequency; and a display panel configured to display an image corresponding to the 4× image signal, wherein:

the primitive image signal comprises an (n−1)-th frame (where n is a natural number) and an n-th frame;

the image signal processing unit comprises a first image interpolation unit and a second image interpolation unit;

the first image interpolation unit is configured to receive the (n−1)-th frame and the n-th frame and output a 2× image signal comprising at least a first interpolated frame;

the second image interpolation unit is configured to receive the (n−1)-th frame and the n-th frame and output a 2× image signal comprising at least a second interpolated frame, the 2× image signal corresponding to two of a ½ interpolated frame, which is inserted between the (n−1)-th frame and the n-th frame, a ¼ interpolated frame, which is inserted between the (n−1)-th frame and the ½ interpolated frame, and a ¾ interpolated frame, which is inserted between the ½ interpolated frame and the n-th frame; and the image signal processing unit further comprises an image timing unit configured to:

stagger the output timing of the image interpolation units such that the interpolated frames output from different image interpolation units are not output at the same time; and insert the first interpolated frame and the second interpolated frame between the (n−1)-th frame and the n-th frame at different timings such that successive interpolation frames in the 4× image signal are output from different interpolation units.

2. The display device of claim 1, wherein the image signal processing unit further comprises an image signal repeater configured to receive the primitive image signal and to transmit the primitive image signal to the first image interpolation unit and the second image interpolation unit.

3. The display device of claim 1, wherein the image signal timing unit is configured to receive two frames from the first image interpolation unit and two frames from the second image interpolation unit and sequentially transmit the total of four frames to the display panel as the 4× image signal.

4. The display device of claim 3, wherein the image signal timing unit comprises four timing chips configured to sequentially transmit an image signal having the same frequency as that of the primitive image signal to the display panel.

5. The display device of claim 1, wherein each of the first image interpolation unit and the second image interpolation unit is configured to calculate a motion vector of an object by comparing the (n−1)-th frame and the n-th frame, and generate one or more interpolated frames by applying different weights to the motion vector.

6. The display device of claim 5, wherein:

the display panel comprises a plurality of display blocks, each said display block comprising a plurality of pixels arranged in a matrix; and each of the first image interpolation unit and the second image interpolation unit is configured to detect the same object from the (n−1)-th frame and the n-th frame by comparing the (n−1)-th frame and the n-th frame.

7. The display device of claim 5, wherein each of the first image interpolation unit and the second image interpolation unit is configured to separate a brightness component and a color-difference component from the (n−1)-th frame, separate a brightness component and a color-difference component from the n-th frame, and calculate the motion vector based on the brightness components of the (n−1)-th frame and the n-th frame.

8. The display device of claim 1, wherein the first image interpolation unit is configured to output the (n−1)-th frame and a ½ interpolated frame, which is inserted between the (n−1)-th frame and the n-th frame.

9. The display device of claim 8, wherein each of the first image interpolation unit and the second image interpolation unit is configured to calculate a motion vector by comparing the (n−1)-th frame and the n-th frame, and calculate a position of an object in each of the ¼, ½, and ¾ interpolated frames based on the motion vector.

10. The display device of claim 9, wherein:

the first image interpolation unit is configured to generate the ½ interpolated frame by applying a weight of ½ to the motion vector; and the second image interpolation unit is configured to generate the ¼ interpolated frame and the ¾ interpolated frame by applying weights of ¼ and ¾, respectively, to the motion vector.

11. The display device of claim 1, wherein each of the first image interpolation unit and the second image interpolation unit is configured to output two frames sequentially.

12. The display device of claim 11, wherein:

the image signal processing unit further comprises an image signal timing unit configured to receive four frames and sequentially transmit the received four frames to the display panel as the 4× image signal; and the image signal timing unit comprises a memory configured to store the received four frames therein.

13. The display device of claim 1, wherein:

the primitive image signal has a frequency of 60 Hz; and the 4× image signal has a frequency of 240 Hz.

14. A display device, comprising:

an image signal processing unit configured to receive a primitive image signal having a first frequency and output a pX image signal (where p is a natural number) having a second frequency, the second frequency being p times that of the first frequency; and a display panel configured to display an image corresponding to the pX image signal, wherein the image signal processing unit comprises at least two image interpolation units, wherein each image interpolation unit is configured to receive the primitive image signal and output a qX image signal comprising an interpolated frame different from that of the other image interpolation unit (where q is a natural number smaller than the natural number p), the qX image signal having a third frequency between the first frequency and the second frequency and corresponding to two of a q/p interpolated frame, which is inserted between the (n−1)-th frame and the n-th frame, a (q−r)/p interpolated frame, which is inserted between the (n−1)-th frame and the q/p interpolated frame, and a (a+r)/p interpolated frame, which is inserted between the q/p interpolated frame and the n-th frame (where r is a natural number smaller than the natural number q), and wherein the image signal processing unit further comprises an image timing unit configured to:

stagger the output timing of the image interpolation units such that the interpolated frames output from different image interpolation units are not output at the same time; and insert the interpolation frame from each of the interpolation units between successive frames of the primitive image signal at different timings such that successive interpolation frames in the pX image signal are output from different interpolation units.

15. The display device of claim 14, wherein the image signal processing unit further comprises an image signal timing unit configured to receive the qX image signal from the at least two image interpolation units and output the pX image signal.

16. The display device of claim 14, wherein the image signal processing unit further comprises an image signal repeater configured to receive the primitive image signal and transmit the primitive image signal to the at least two image interpolation units.

17. The display device of claim 14, wherein each of the image interpolation units is configured to calculate a motion vector of an object by comparing the (n−1)-th frame and the n-th frame, and generate one or more interpolated frames by applying different weights to the motion vector.

18. A display device comprising:

an image signal processing unit configured to receive a primitive image signal having a first frequency and outputting a 4× image signal having a second frequency, the second frequency being four times that of the first frequency; and a display panel configured to display an image corresponding to the 4× image signal, wherein:

the primitive image signal comprises an (n−1)-th frame (where n is a natural number) and an n-th frame;

the image signal processing unit comprises a first image interpolation unit, a second image interpolation unit, and an image signal timing unit;

the first image interpolation unit is configured to receive the (n−1)-th frame and the n-th frame and output the (n−1)-th frame and a ½ interpolated frame, which is inserted between the (n−1)-th frame and the n-th frame;

the second image interpolation unit is configured to receive the (n−1)-th frame and the n-th frame and output a ¼ interpolated frame, which is inserted between the (n−1)-th frame and the ½ interpolated frame, and a ¾ interpolated frame, which is inserted between the ½ interpolated frame and the n-th frame;

the image signal timing unit is configured to receive the (n−1)-th frame and the ½ interpolated frame from the first image interpolation unit and the ¼ interpolated frame and the ¾ interpolated frame from the second image interpolation unit and sequentially transmit the total of four frames to the display panel as the 4× image signal; and each of the first image interpolation unit and the second image interpolation unit is configured to calculate a motion vector by comparing the (n−1)-th frame and the n-th frame, and calculate a position of an object in each of the ¼, ½, and ¾ interpolated frames based on the motion vector.

19. The display device of claim 18, wherein the (n−1)-th frame, the ¼ interpolated frame, the ½ interpolated frame, and the ¾ interpolated frame are different from each other.

* * * * *